ELECTROMAGNETIC TRANSDUCER HEAD ACTUATORS

Filed April 9, 1962 2 Sheets-Sheet 1

INVENTOR.
CHARLES N. PETERSON
BY
Bower & Patalidis
ATTORNEYS

ELECTROMAGNETIC TRANSDUCER HEAD ACTUATORS

Filed April 9, 1962 2 Sheets-Sheet 2

INVENTOR.
CHARLES N. PETERSON
BY
Bower & Patalidis
ATTORNEYS

United States Patent Office 3,218,873
Patented Nov. 23, 1965

3,218,873
ELECTROMAGNETIC TRANSDUCER HEAD ACTUATORS

Charles N. Peterson, Waterford, Mich., assignor to Ex-Cell-O Corporation, Detroit, Mich., a corporation of Michigan Filed Apr. 9, 1962, Ser. No. 186,266
9 Claims. (Cl. 74—99)

The invention relates to actuators in general and more particularly to actuators built in the support members used in conjunction with selfaligning electromagnetic transducer heads adapted to be borne by a laminar flow of fluid clinging to the surface of a rapidly moving recording medium.

In copending application Serial No. 157,667, filed on December 7, 1961 in the name of Joseph E. Smith, Jr., now Patent No. 3,187,317, there is described a magnetic data storage apparatus utilizing a plurality of fluid supported electromagnetic transducer heads adapted to record information on and playback information from a plurality of concentric tracks on a magnetizable medium. The magnetizable medium is on the side surfaces of a series of discs mounted on a common spindle for rotation thereby. Each individual transducer head is mount on a pad affixed to the free end of a resilient flat spring or reed, and copending patent application Serial No. 132,160 filed August 17, 1961 in the name of L. S. Bleininger, now abandoned, describes in detail such a type of transducer head.

The other end of the reeds supporting the transducer heads is mounted on a support bar affixed to the upper end of a rocker arm. A plurality of rocker arms are mounted in such a way as to cause the transducer heads mounted thereon to scan the surface of the discs. Several transducer heads are disposed in two parallel rows to record on and playback from the facing sides of two consecutive discs. One row only of transducer heads is of course required for the outer faces of the end discs.

When the discs are stationary, the transducer head pads are normally retracted away from the disc surface. When the apparatus is operating, the transducer head pads are brought in close proximity to the record surface and are supported thereaway by a laminar film of gas fluid. The transducer head pads are brought to the latter position by bending or biasing of the flat spring reeds mounting the transducer head pads upon the support bar. A safety interlock mechanism, usually under the control of a tachometer, prevents this action from occurring unless the discs are rotating at a velocity sufficient to create a laminar film of gas fluid capable of supporting the transducer head pads.

The principal object of the present invention is to provide an actuator effecting the bending or biasing of the spring reeds to bring the transducer heads in close proximity to the recording surface.

Another object of the invention is to provide an actuator of the character indicated, which permits manual adjustment of the amount of bias on the spring reeds.

A further object of the invention is to provide an actuator which is simple to operate, which is sturdy and which remains accurate over a long period of time.

Still another object of the invention is to provide an actuator which is not subject to wear and which has a minimum amount of parts that could introduce friction.

Other objects and advantages will become apparent from the following description taken in consideration with the attached drawings which describe some of the best modes which have been contemplated for using the principles of the invention, and in which like numerals refer to like or equivalent parts.

FIGURE 9 is a view similar to FIGURE 8, but showing the apparatus in the position that biases the transducer head spring reeds;

In general the invention consists of a transducer head support bar carrying at least one transducer head pad attached thereon by one end of a flat spring reed. A power operated slide member mounted on the bar is capable of occupying a first position when the magnetic data storage device is inoperative, and a second position as soon as the discs of the magnetic data storage device attain a velocity sufficient to create a laminar film of gas capable of supporting the transducer head pad. Mechanical means are provided to transform the sliding motion of the slide into an adjustable biasing action upon the transducer head spring reed.

Figures 1, 2, 3:
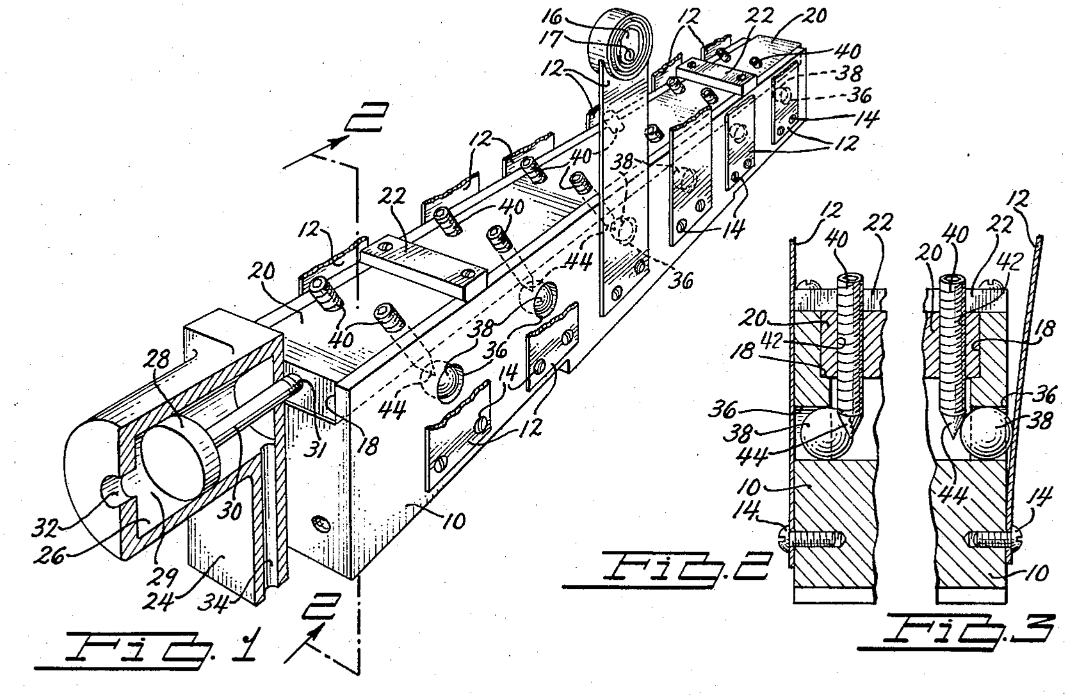
FIGURE 1 is a perspective view of an embodiment of the invention, with some portions broken away for more clarity.
FIGURE 2 is a partial cross-sectional view along line 2—2 of FIGURE 1, showing the apparatus at rest.
FIGURE 3 is substantially a mirror image of FIGURE 2, but showing the apparatus in the position that biases the transducer head spring reeds.

Referring now to the drawings, and more particularly to FIGURES 1–2 thereof, a transducer head bar support, according to the invention, is represented as consisting of a substantially parallelepipedonic housing 10 supporting by one end at least one leaf spring reed 12 fastened to the housing in a conventional manner such as by set screws 14. On the other end of the spring reed is mounted a transducer head pad 16 supporting a transducer head 17 for recording on and playback from a magnetic surface disc (not shown), as explained in more details in copending application Serial No. 132,160, now abandoned, and in Patent No. 3,187,317.

The housing 10 presents on its upper face a channel 18 in which is disposed a slide 20. Means such as retainers 22 are provided for maintaining the slide 20 in the channel.

A cylinder housing 24 is affixed to one end of the housing 10. A cylinder 26 is adapted to contain a double acting piston 28 slidable within the cylinder and whose motion is transmitted to the slide 20 by means of the connecting rod 30. Ports 32 and 34 place both sides of the piston 28 in fluid communication with a source of fluid under pressure (not shown) via valves (not shown). It is evident that when fluid under pressure is introduced to one side of the piston 28 while fluid is exhausted from the other side of the piston, the piston is caused to be displaced in one direction thereby displacing the slide 20 in the same direction; when fluid under pressure is introduced on the other side of the piston while fluid is being exhausted from the first side, the piston and consequently the slide 20 are caused to be displaced in an opposite direction.

The housing 10 presents a series of bores 36 substantially at right angle with the longitudinal axis of the housing and which contain balls, designated by numeral 38. One such ball is provided for each spring reed 12.

The slide 20 carries a set screw 40 corresponding to each ball 38, and which is threadable through inclined tapped holes 42. Each set screw has a conical end portion 44 protruding below the slide 20 and which is disposed in such a way as being normally proximate and even touching upon the ball 38, but not pressing against it.

When the magnetic data storage device is not operating, the slide 20 normally occupies a position as indicated in FIGURES 1 and 2. The conical end portion 44 of the set screw 40 is not pressing against the ball 38 and the spring reed 12 maintains the transducer head pad 16 in a retracted position away from the record surface. As soon as the discs of the magnetic data storage device reach a velocity sufficient to create a gas bearing for the transducer head pad, fluid under pressure is introduced into the cylinder chamber 29, displacing the piston 28 and consequently the slide 20 toward the right as seen in FIGURE 1. The conical end portion 44 of the set screw 40 is forced to press against the ball 38, as illustrated in FIGURE 3, and displaces the ball in such a way as to cause it to protrude slightly beyond the end of the bore 36, thereby bending the spring reed 12 and bringing the transducer head pad 16 into an operative position in close proximity to the record surface, being supported in this position by the laminar film of gas clinging to the record surface.

The amount of bending of the spring reeds 12 is individually determined by the adjustment of the set screws 40. The more the set screws 40 are caused to protrude below the slide 20, the more the camming action of their conical end portions 44 will cause the balls 38 to protrude and bend the spring reeds 12.

Means may normally be provided to limit the amount of travel of the slide 20 in both directions, or alternately the amount of stroke of the piston 28 may also be limited by appropriate abutments (not shown) in the cylinder 26, or the stroke may be determined by the actual dimensions of the cylinder. The connecting rod 30 has a threaded end 31 for adjustable and disconnectable junction with the slide 20 by being threadable in an appropriate tapped aperture in the slide.

The slide 20 is returned to the position that retracts the transducer head pads by the springback action of the reeds 12 pressing against the balls 38 which in turn press against the conical end portions 44 of the set screws 40, thereby urging the slide 20 to its left hand position, as seen in FIGURE 1. This return stroke of the slide 20 may be helped by springs if so desired, and by introducing fluid under pressure through port 34 and exhausting fluid from chamber 29 via port 32.

Figures 3, 4, 5, 6, 7, 8:
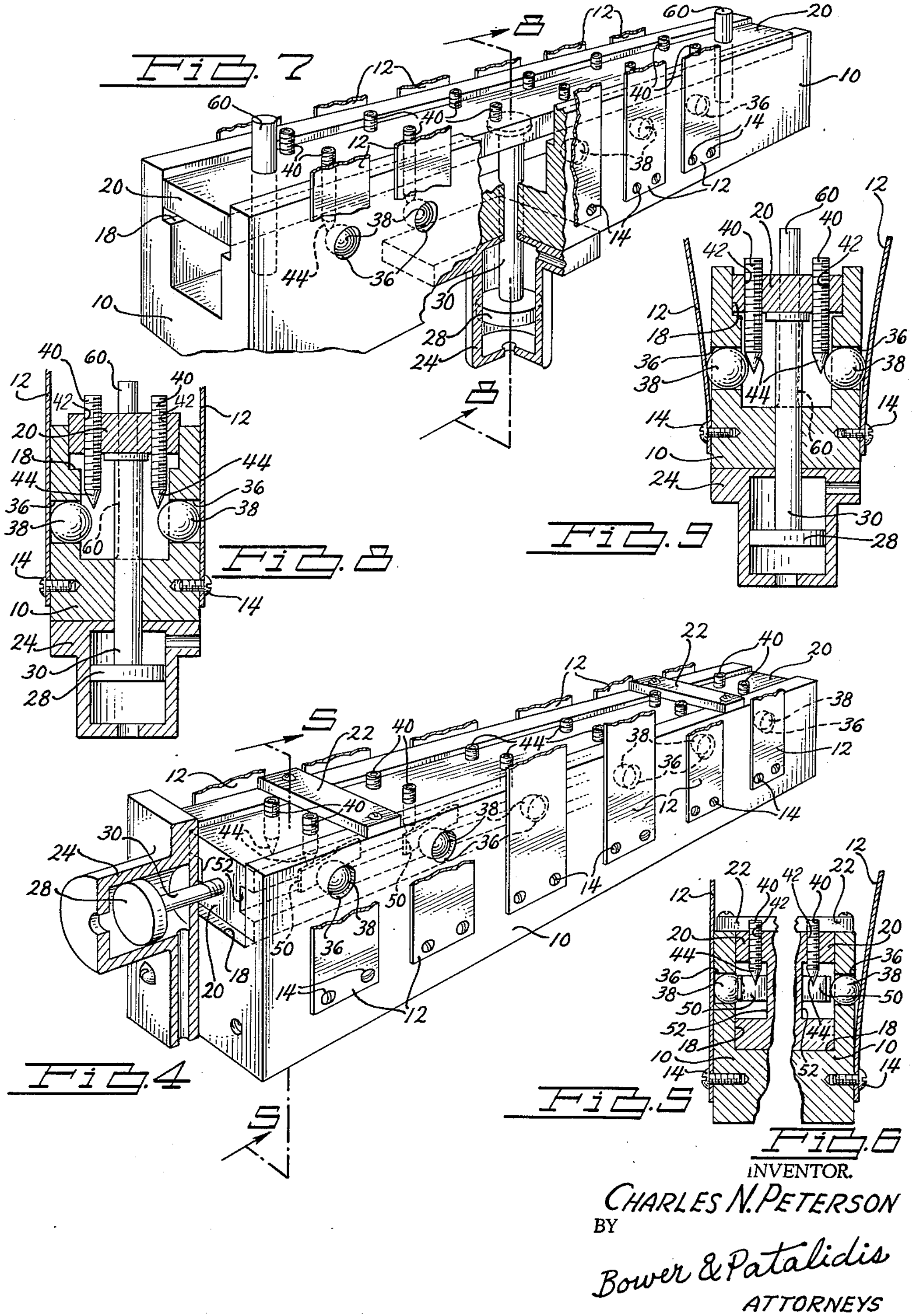
FIGURE 4 is a modification of the apparatus of FIGURE 1.
FIGURE 5 is a partial cross-sectional view along line 5—5 of FIGURE 4, showing the apparatus at rest.
FIGURE 6 is substantially a mirror image of FIGURE 5, but showing the apparatus in the position that biases the transducer head spring reeds.
FIGURE 7 is another modification of the invention.
FIGURE 8 is a cross-sectional view along line 8—8 of FIGURE 7.

The modification of FIGURES 4–5 comprises the same elements as in FIGURES 1–2, with the exception of the slide 20 which is H-shaped when viewed in a transversal cross-section. A series of ramp-like resilient tabs 50 is disposed on both sides of a narrowed portion 52 of the slide 20, the tabs 50 being integral with or fastened to the slide, and each one of the tabs corresponding to one of the balls 38. The set screws 40, which are adjustably threaded from the top of the slide 20, have their conical end portions 44 adapted to bear against the inner sides of the tabs 50 for the purpose of adjusting the amount of inclination of the tabs. As previously indicated the tabs 50 are resilient and are normally biased or urged towards the slide 20, and the conical end portions 44 of the set screws force the free ends of the tabs 50 to separate more or less from the narrowed portion 52 of the slide 20, thereby increasing or decreasing their camming action upon the balls 38.

When the slide 20 is displaced away from its rest position, the balls 38 set in the transversal bores 36 in the housing 10 are caused to protrude outwardly by riding on the ramps formed by the tabs 50, thereby bending the leaf spring reeds 12. This position is illustrated by FIGURE 6.

FIGURES 7–8 illustrate another modification of the invention, in which the cylinder housing 24 is mounted below the transducer bar mount housing 10, instead of being affixed to one end thereof as in the previously described embodiments. The slide 20 is adapted for up and down motion, as shown in the drawings, under the action of the connecting rod 30 of the double acting piston 28. Studs 60 fastened to the housing 10 guide and maintain the slide 20 in position during its up and down motion. The set screws 40 are normally adjusted in such a way as to have the conical end portions 44 clear of the balls 38 when the slide is displaced to its upper position (FIGURE 8). When the slide 20 is displaced to its lower position (FIGURE 9), the conical end portions 44 of the set screws 40 bear against the balls 38 and force them outwardly causing them to protrude from their bores 36, thereby bending the leaf spring reeds 12. The amount of bending imposed upon each spring reed 12 is of course dependent from the adjustment of the corresponding set screw 40 and the resultant camming action of the conical end portion 44 of the set screw.

Figures 10, 11, 12:
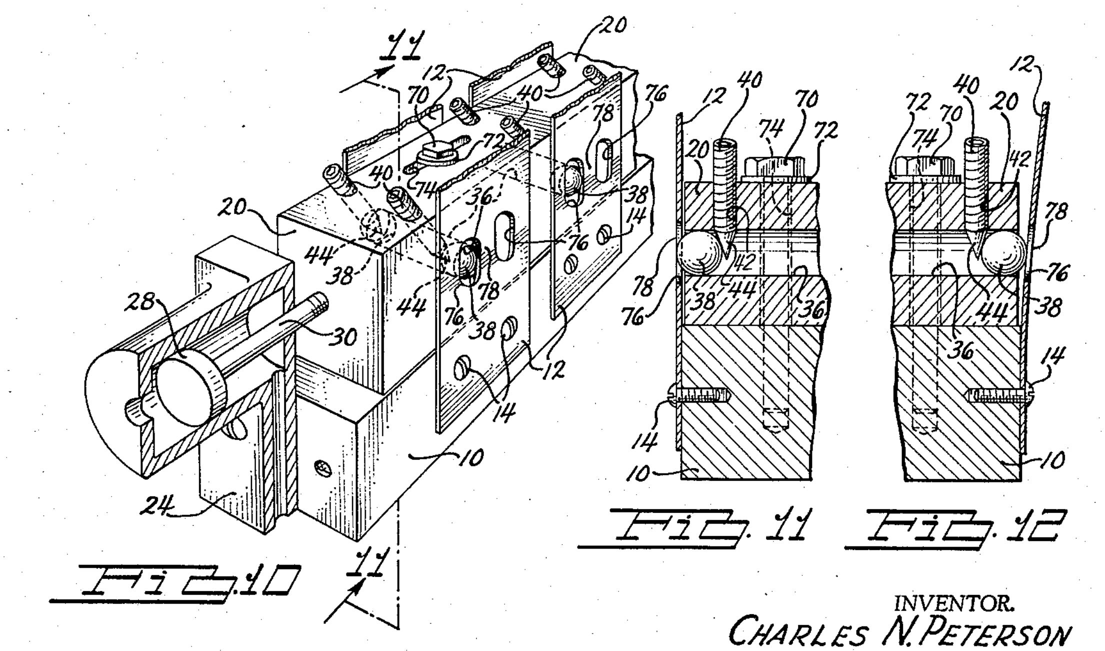
FIGURE 10 is still another modification of the invention.
FIGURE 11 is a partial cross-sectional view of the apparatus along line 11—11 of FIGURE 10.
FIGURE 12 is substantially a mirror image of FIGURE 11, but showing the apparatus in the position that biases the transducer head spring reeds.

In the modification of FIGURES 10–11 the slide 20 is slidably mounted upon the housing 10 by means of the bolts 70 and washers 72, the bolts 70 being screwed into the housing 10 and passing through the vertical elongated holes 74 in the slide 20. Bores 36 are disposed transversely in the slide 20 and contain balls 38 maintained in position by means of the conical end portions 44 of the set screws 40. The set screws are adjusted in such a way that balls 38 are at all times protruding slightly from the side of the slide 20.

The spring reeds 12 are provided with clearance holes 76, separated by a bridge portion 78, and the balls 38 are normally registering with the first of the clearance holes 76 in such a way as to normally cause no or little deflection of the spring reeds 12. When the slide 20 is displaced to its operative position, the balls 38 are forced to register with the bridge portions 78 of the spring reeds (FIGURE 12), thereby causing the spring reeds 12 to be bent outwardly. The amount of adjustment of the set screws 40 determines the amount of bending of the spring reeds 12. Two clearance holes 76 are shown for each spring reed 12 because the reeds 12 are universal type of reeds that are used for supporting left-hand and right-hand transducer heads.

It is obvious that the fluid power means actuating the slide may be replaced by electrical or other power means without departing from the scope and spirit of the invention. It is also obvious that one or more transducer heads can be mounted on a support bar-actuator according to the invention and that the support bar-actuator can be oriented in space in any position.

It is also obvious that the balls used to bear against the spring reeds may be replaced by small metal rods or plungers, such balls, rods or plungers being generally designated as movable deflecting members, without departing from the scope and spirit of the invention, such balls, rods or plungers being generally designated as slidable deflecting members in the appended claims.

Further, it will be clear that the embodiments of the invention may be changed in many ways without affecting the essence of the invention as described in the annexed claims.

What is claimed as new is:

1. An actuator for imposing a predetermined amount of deflection upon at least one resilient reed member having one end affixed to a stationary support member, said actuator comprising: a ball adapted to be displaceable to a portion where said ball contacts and deflects said resilient reed member; wedge means which occupies a first position disengaged from said ball and a second position engaging said ball to cause said ball to deflect said resilient reed member; said wedge means comprising essentially a threaded member provided with a conical end portion; a slide member reciprocable in relation to said stationary member and carrying said wedge means by being provided with a threaded bore for receiving said threaded member; motor means reciprocating said slide means between two extreme positions; and adjusting means operatively connected to said threaded member for manually adjusting the amount of wedging action of said wedge means upon said ball to control the amount of deflection of said resilient reed member.

2. The actuator of claim 1 wherein said slide member is movable along the longitudinal axis of said stationary support member.

3. The actuator of claim 1 wherein said slide member is movable in a direction normal to the longitudinal axis of said stationary support member.

4. The actuator of claim 1 wherein said wedge means further comprises a ramp-like tab member affixed to said slide member and engaged by the conical end portion of said threaded member, the inclination of said tab member being adjustable by way of adjustment of said threaded member.

5. The actuator of claim 1 wherein said ball is situated in a transverse bore in said side member and is adapted to protrude from said bore of a predetermined amount adjustable by way of the conical end portion of said threaded member threadable substantially normally to the axis of said transverse bore and said ball normally registers with a clearance aperture in said resilient reed member and is displaceable by said slide member to a position where said ball bears against a solid portion of said resilient reed member for deflection thereof.

6. Apparatus for imposing on a plurality of spring reed members a displacement tending to deflect said spring reed members by a predetermined amount, said apparatus comprising in combination: a housing supporting said spring reed members; a slide member in said housing; power means reciprocating said slide member between two extreme positions; slidable deflecting members, one of such slidable deflecting members being provided for each of said spring reed members and being individually operated by said slide member by means comprising a threaded member affixed to said slide member, said threaded member being provided with a conical end portion adapted to displace said slidable deflecting member through a transversal bore in said housing; and adjusting means operatively connected with said slide member for adjusting the amount of displacement transmitted by each slidable deflecting member to each of said spring reed members.

7. The apparatus of claim 6 wherein each slidable deflecting member is operated by the slide member by means consisting of a ramp-like tab whose inclination is adjustable by way of the threaded member affixed to said slide member, said tab displacing said slidable deflecting member through a transversal bore in said housing.

8. The apparatus of claim 6 wherein each slidable deflecting member is a ball.

9. The apparatus of claim 8 wherein each ball protrudes from a transverse bore in said slide member and registers with a clearance aperture in each of said spring reed members, said ball being displaceable by longitudinal motion of said slide member to a position where it bears against a solid portion of said spring reed member.

References Cited by the Examiner

UNITED STATES PATENTS

| | | | |
|---|---|---|---|
| Re. 17,022 | 6/1928 | Vasselli | 74—10.1 |
| 1,905,047 | 4/1933 | Norin | 74—110 |
| 2,504,307 | 4/1950 | Dalton | 200—153.12 |
| 2,633,036 | 3/1953 | Winter. | |
| 2,675,435 | 4/1954 | Framhein | 74—110 X |
| 2,700,717 | 1/1955 | Berthiez | 74—110 X |
| 2,748,229 | 5/1956 | Block | 74—2 X |
| 2,924,103 | 2/1960 | Hamilton | 74—2 |
| 2,982,194 | 5/1961 | Hannafin | 74—2 X |

BROUGHTON G. DURHAM, *Primary Examiner.*

DON A. WAITE, *Examiner.*